Patented May 2, 1933

1,906,314

UNITED STATES PATENT OFFICE

ALBERT M. CLIFFORD, OF STOW, AND WERNER M. LAUTER, OF AKRON, OHIO, ASSIGNORS TO THE GOODYEAR TIRE & RUBBER COMPANY, OF AKRON, OHIO, A CORPORATION OF OHIO

AGE RETARDER

No Drawing. Application filed September 18, 1931. Serial No. 563,665.

This invention relates to methods of preserving organic materials. More particularly it relates to methods of preserving rubber, balata, and similar rubber-like substances.

One of the objects of the invention is to provide a method of treating materials of the above indicated character whereby to retard the decay and resultant loss of tensile strength and elasticity thereof, occasioned by the attacks of atmospheric oxygen, sunlight and heat. Other objects and advantages will become apparent from the following description.

Heretofore, it has been observed that certain organic substances, such as reaction products of aldol and alpha naphthylamine, hydroquinone and similar substances, when incorporated in rubber, have the effect of retarding the action of oxygen, sunlight and heat which, under ordinary circumstances, cause premature decay and degeneration of rubber materials. Although many substances having similar age-retarding properties are known to the industry, most of such materials heretofore employed for this purpose are objectionable for various reasons; for example, some of them are poisonous to the workmen employed in handling them, and in order to use them in commercial practice, it has been necessary to take great precautions to overcome these effects. Still other materials are only mildly antioxidant in their properties or are objectionable because they can not be incorporated in the rubber except by subjecting the latter to excessive milling operations, or because they are too expensive for commercial application.

This invention resides in the discovery that amino fluorenes and derivatives thereof constitute excellent preservatives or age retarders for rubber compounds. The fluorenes, the basic materials for the manufacture of these antioxidants, are obtained as a coal tar distillate in the fraction which boils from 265 to 400 degrees C., commonly termed the methyl naphthalene or anthracene oil fraction. The amino fluorenes are obtained from the basic materials by subjecting the latter to nitration, preferably while they are suspended in cool or cold glacial acetic acid. The nitro derivative thus obtained may be conveniently reduced to the amino compound by subjecting it to reduction by means of iron filings and hydrochloric acid or ammonium chloride. Since this type of reaction is well understood by chemists, detailed description thereof is not deemed necessary. Moreover, the exact procedure is adequately described in Berichte, volume 12, 235; volume 35, 2384; volume 102, 3289; in Beilstein XIII (new series), 267; in Beilstein II, 246 and in Beilstein XII (new series), 1331. The compounds may be adequately purified for commercial purposes merely by dissolving them in a convenient organic solvent and allowing crystallization to take place. Compounds such as 2-amino fluorene

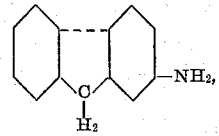

2-7-diamino fluorene

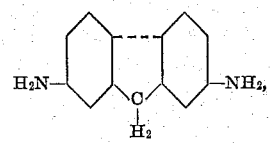

and methylene di(amino fluorene)

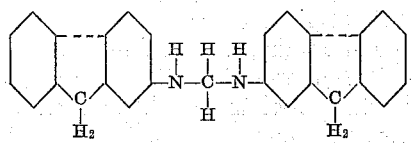

constitute specific examples of compounds of this class which are highly satisfactory as antioxidant materials. The melting points of these three compounds were found to be as follows: amino fluorene, 124–127 degrees C., diamino fluorene, 120–130 degrees C., and methylene di(amino fluorene) 200–202 degrees C.

The formic acid and aldehyde derivatives of amino fluorenes are excellent antioxidants also. As a specific example of a material of this class, attention is called to the formic acid derivative of 2-amino fluorene, indicated by the following formula:

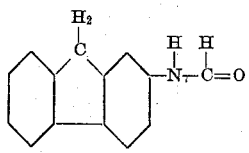

A convenient method of preparing the compound consists in nitrating the simple fluorene while it is dissolved in glacial acetic acid or other convenient neutral solvent while subjected to a relatively low temperature. The nitro derivative may then be reduced to an amino compound by subjecting it to the action of iron filings and hydrochloric acid and a two percent ammonium chloride solution. The amino body thus obtained is readily reacted with ninety percent formic acid to form the above indicated compound which has a melting point of from 162 to 163 degrees C.

Another example of an antioxidant of this class is the butyraldehyde derivative of 2-amino fluorene, having the formula

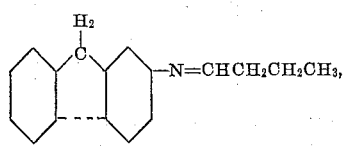

which may be manufactured by dissolving one mol of 2-amino fluorene in warm alcohol (ethyl alcohol) and adding thereto 1 mol of butyric aldehyde, also dissolved in alcohol. The resulting solution is permitted to stand until a paste is formed which may then be solidified by adding water. The reaction product is obtained in a state of sufficient purity for commercial use and in a yield of approximately 70% of the theoretically possible value merely by decanting off the water and drying the residue. The brown powder thus obtained melts from 60 to 70 degrees C. No references to any such compound were found in the literature.

The compounds thus obtained may be added with satisfactory results to substantially any of the ordinary rubber compounds. However, the following constitute examples of such materials in which they have been found by actual experience to be particularly satisfactory.

Formula A

| | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

Formula B

| | Parts |
|---|---|
| Smoked sheet rubber | 100 |
| Zinc oxide | 92.5 |
| Carbon black | .6 |
| Ferric oxide | .7 |
| Sulfur | 3.5 |
| Diphenylguanidine | .7 |
| Antioxidant | 5 |

Test sheets in which these amino fluorenes and derivatives thereof were employed as antioxidants were prepared is accordance with each of the above formulæ. One set of sheets prepared in accordance with Formula A was subjected to what is termed a "low temperature" accelerated age test, being in an oxygen bomb under a pressure of 150 pounds of oxygen per square inch and at a temperature of 50 degrees C. for a period of six days. At the conclusion of this period of artificial aging, the sheets were removed from the bomb and subjected to physical tests in order to ascertain the tensile strength and elasticity thereof.

A corresponding set of sheets prepared in accordance with Formula B was subjected to what is termed a "high temperature" accelerated age test, being placed in a bomb charged with air under a pressure of 80 pounds per square inch at a temperature of 114 degrees C. for a period of 7 hours, after which the sheets were removed from the bomb and subjected to physical tests in order to ascertain the tensile strength and elasticity thereof. The results of these tests, together with corresponding physical tests conducted upon the remaining sets of sheets which were not subjected to artificial aging but which were included for purposes of comparison, are tabulated as follows:

*Low temperature tests*

| | Original | | | | Aged | | | | |
|---|---|---|---|---|---|---|---|---|---|
| Cure mins. F° | Modulus kgs/cm² 500% | Modulus kgs/cm² 700% | Ultimate tensile kgs/cm² | Max. elong. in % | Modulus kgs/cm² 500% | Modulus kgs/cm² 700% | Ultimate tensile kgs/cm² | Max. elong. in % | Per cent weight increase |
| 2-7-DIAMINO FLUORENE | | | | | | | | | |
| 35/285 | 16 | 58 | 137 | 840 | 20 | 75 | 132 | 795 | 0.05 |
| 50 | 22 | 95 | 170 | 800 | 27 | 110 | 142 | 745 | |
| 70 | 33 | 144 | 174 | 730 | 40 | | 162 | 690 | .16 |
| 2-AMINO FLUORENE | | | | | | | | | |
| 35/285 | 20 | 70 | 140 | 820 | 21 | 75 | 136 | 795 | .05 |
| 50 | 28 | 109 | 163 | 770 | 28 | 119 | 146 | 735 | .06 |
| 70 | 44 | 180 | 180 | 700 | 45 | | 160 | 685 | .14 |
| METHYLENE DI(2-AMINO FLUORENE) | | | | | | | | | |
| 35/285 | 18 | 64 | 134 | 820 | 23 | 90 | 142 | 775 | .83 |
| 50 | 28 | 113 | 164 | 760 | 33 | 134 | 163 | 735 | .12 |
| 70 | 42 | 179 | 185 | 705 | 50 | | 186 | 690 | |

Low temperature tests—Continued

| Cure mins. F° | Original | | | | Aged | | | | Per cent weight increase |
|---|---|---|---|---|---|---|---|---|---|
| | Modulus kgs/cm² | | Ultimate tensile kgs/cm² | Max. elong. in % | Modulus kgs/cm² | | Ultimate tensile kgs/cm² | Max. elong. in % | |
| | 500% | 700% | | | 500% | 700% | | | |

FORMYL 2-AMINO FLUORENE

| 35/285 | 14 | 46 | 107 | 840 | 19 | 61 | 98 | 780 | 0.19 |
| 50 | 20 | 74 | 137 | 800 | 23 | 80 | 129 | 780 | .27 |
| 70 | 27 | 110 | 155 | 755 | 32 | 117 | 143 | 735 | .36 |

High temperature tests

| | 300% | 500% | | | 300% | 500% | | | |
|---|---|---|---|---|---|---|---|---|---|

2-AMINO FLUORENE

| 35/285 | 27 | 80 | 180 | 675 | 18 | 42 | 60 | 580 | |
| 50 | 32 | 95 | 200 | 670 | 26 | 56 | 92 | 615 | |
| 70 | 38 | 106 | 202 | 645 | 32 | 70 | 108 | 625 | |

METHYLENE DI(2-AMINO FLUORENE)

| 35/285 | 24 | 71 | 174 | 710 | 18 | 44 | 54 | 565 | |
| 50 | 26 | 82 | 206 | 715 | 23 | 57 | 93 | 615 | |
| 70 | 34 | 102 | 229 | 690 | 28 | 69 | 110 | 610 | |

FORMYL 2-AMINO FLUORENE

| 35/285 | 31 | 88 | 132 | 595 | 11 | | 24 | 495 | |
| 50 | 37 | 103 | 150 | 580 | 16 | | 30 | 475 | |
| 70 | 40 | 114 | 166 | 585 | 21 | 46 | 53 | 540 | |

BUTYLIDENE AMINO FLUORENE

| 35/285 | 26 | 76 | 106 | 575 | 17 | 41 | 54 | 565 | |
| 50 | 33 | 99 | 182 | 645 | 23 | 54 | 72 | 570 | |
| 70 | 40 | 116 | 210 | 645 | 26 | 63 | 79 | 570 | |

By comparison of the results obtained from the artificially aged samples and the unaged samples, it will be apparent that the samples containing the new antioxidants resist deterioration caused by oxygen to a remarkable degree even in the cases where a temperature of 114 degrees is employed. In fact, the samples which were subjected to the low temperature age test at 50 degrees C. exhibited substantially as good physical properties as the unaged materials even after having been subjected to oxidation for a period of six days. Materials containing no antioxidant, upon being subjected to similar conditions, are reduced to resinous materials sustantially void of tensile strength and elasticity.

It is to be understood that the invention is not limited to the compounds disclosed but also includes reaction products of those materials in which various other hydrocarbon radicals are substituted in lieu of one or more of the hydrogen atoms in the amino group or groups. Other poly amino fluorenes are included in this invention too, in addition to those previously mentioned. It is possible to manufacture other aldehyde derivatives of amino fluorenes merely by reacting the amino fluorenes with the aldehyde desired in the same manner as disclosed for butyraldehyde, illustrative examples of the aldehydes being formaldehyde, acetaldehyde, propionaldehyde, heptaldehyde, crotonaldehyde, acrolein and acetaldol. It is also possible to form related compounds merely by reacting the amino fluorene with aliphatic acids particularly the lower members of that series such as formic acid. The amino fluorenes may further be reacted with phenolic compounds such as alpha naphthol or beta naphthol, or they may be reacted with the halides of the aliphatic hydrocarbons, such as butyl chloride. All of the reaction products thus obtained may be employed as antioxidants in the rubber compounds which have previously been indicated or in rubber compounds of similar character.

These antioxidants are particularly desirable from a commercial viewpoint because the methyl naphthalene fraction constituting the basic ingredient is obtained as a coal tar by-product for which there is little use at the present time. By nitrating, reducing and further reacting these otherwise useless materials with either aldehydes, fatty acids, or aliphatic hydrocarbon halides, excellent antioxidants for rubber are obtained. In addition to being excellent preservatives in the rubber in which they are incorporated, these antioxidants are substantially non-odorous and non-toxic, are relatively soluble in rubber and may be incorporated in that material with ease.

It is to be undertsood that the fluorenes used in this invention are not limited to those found in the methyl naphthalene coal tar fraction, but those found in any other source may be used also.

Although only the preferred forms of the invention have been illustrated, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What is claimed:

1. A method of preserving rubber which comprises subjecting it to vulcanization in the presence of a primary amino fluorene.

2. A method of preserving rubber which comprises subjecting it to vulcanization in the presence of a di-primary amino fluorene.

3. A method of preserving rubber which comprises subjecting it to vulcanization in the presence of a poly primary amino fluorene.

4. A method of preserving rubber which comprises subjecting it to vulcanization in the presence of an aldehyde derivative of amino fluorene.

5. A method of preserving rubber which comprises subjecting it to vulcanization in the presence of a reaction product of a primary amino fluorene and an aliphatic aldehyde.

6. A method of preserving rubber which comprises subjecting it to vulcanization in the presence of a material having the following formula:

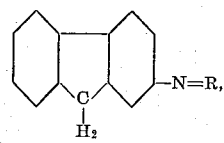

where R is an aldehyde residue.

7. A method of preserving rubber which consists in subjecting it to vulcanization in the presence of a butyraldehyde derivative of amino fluorene.

8. A method of preserving rubber which consists in subjecting it to vulcanization in the presence of the formic acid derivative of a primary amino fluorene.

9. A method of preserving rubber which consists in subjecting it to vulcanization in the presence of a material having the formula

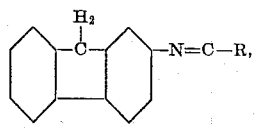

in which R is an aliphatic hydrocarbon group.

10. A rubber product that has been vulcanized in the presence of a di-primary amino fluorene.

11. A rubber product that has been vulcanized in the presence of a primary amino fluorene.

12. A rubber product that has been vulcanized in the presence of a secondary amino fluorene.

13. A rubber product that has been vulcanized in the presence of a poly primary amino fluorene.

14. A rubber product that has been vulcanized in the presence of 2-7-diamino fluorene.

15. A rubber product that has been vulcanized in the presence of a reaction product of amino fluorene and an aldehyde.

16. As a new composition of matter adapted for use as an antioxidant in rubber, the reaction product of 2-amino fluorene and an aldehyde containing at least two carbon atoms.

17. As a new composition of matter adapted for use as an antioxidant in rubber, the reaction product of a primary amino fluorene and an aliphatic aldehyde containing at least two carbon atoms.

18. A method of preserving rubber which comprises subjecting it to vulcanization in the presence of the reaction product of a primary amino fluorene and a material selected from a group consisting of formic acid and the aliphatic aldehydes.

19. A method of preserving rubber which comprises subjecting it to vulcanization in the presence of a fluorene selected from a group consisting of primary amino fluorenes, secondary amino fluorenes, aldehyde derivatives of primary amino fluorenes and the formic acid derivative of primary amino fluorenes.

20. A rubber product that has been vulcanized in the presence of a fluorene selected from a group consisting of primary amino fluorenes, secondary amino fluorenes, aldehyde derivatives of primary amino fluorenes and the formic acid derivative of primary amino fluorenes.

In witness whereof, we have hereunto signed our names at Akron, in the county of Summit and State of Ohio, this 17th day of September, 1931.

ALBERT M. CLIFFORD.
WERNER M. LAUTER.